Sept. 14, 1954     A. VON WANGENHEIM     2,688,978
LIQUID FLOW CHECK VALVE

Filed June 20, 1950                         2 Sheets—Sheet 1

INVENTOR.
BY Adolf von Wangenheim
Andrew K. Fouch
his ATTORNEY

Sept. 14, 1954 A. VON WANGENHEIM 2,688,978
LIQUID FLOW CHECK VALVE

Filed June 20, 1950 2 Sheets-Sheet 2

FIG. 8-A

*INVENTOR.*
Adolf von Wangenheim
BY
Andrew K. Fouled
his ATTORNEY

Patented Sept. 14, 1954

2,688,978

UNITED STATES PATENT OFFICE 2,688,978

LIQUID FLOW CHECK VALVE

Adolf von Wangenheim, Detroit, Mich., assignor to Detroit Controls Corporation, a corporation of Michigan Application June 20, 1950, Serial No. 169,196

11 Claims. (Cl. 137—512.15)

This invention relates to new and useful improvements in liquid flow check valves.

One of the objects of this invention is to provide a new and improved check valve.

Another object is to provide a simple inexpensive check valve requiring only a flexible valve member and a valve seat member.

Another object is to provide a flexible check valve having an improved means for mounting the same to a valve seat member.

Another object is to provide a simple and inexpensive check valve operable to control liquid flow to two separate conduits simultaneously.

Another object is to provide a simple check valve which will leak at predetermined low back pressures and which will seat tightly at predetermined high back pressures.

Another object is to provide a molded rubber or elastomeric check valve member of simple and inexpensive construction.

Other objects will become apparent from time to time throughout the specification and claims as hereinafter related.

Figure 1:
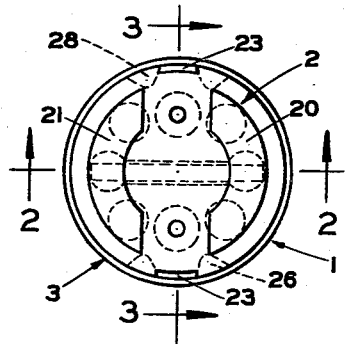
Figure 3:
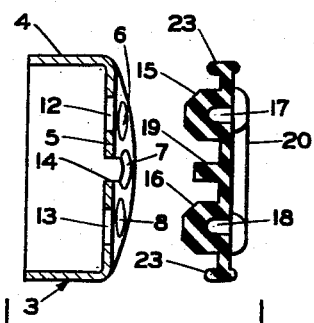
Figures 2, 6:
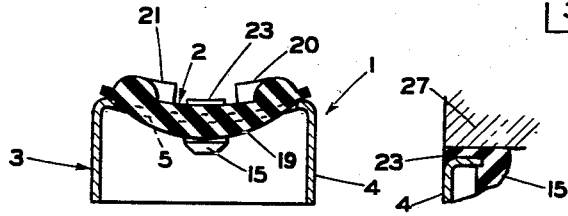
Figure 4:
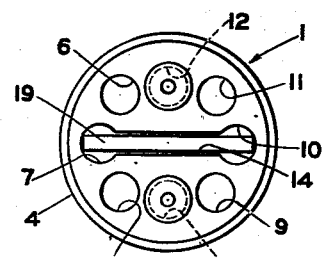
Figure 5:
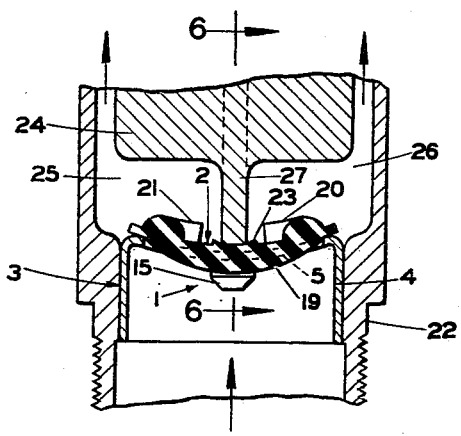

In the accompanying drawing, to be taken as a part of this specification, there are clearly and fully illustrated two preferred embodiments of this invention, in which drawing:

Figure 1 is a plan view of a check valve and valve seat member embodying one form of this invention, Fig. 2 is a sectional view taken on the line 2—2 of Fig. 1, Fig. 3 is a sectional view taken on the line 3—3 of Fig. 1, but is exploded to show the valve member separately from the valve seat member, Fig. 4 is a bottom plan view of the valve seat member and valve member of Fig. 1, Fig. 5 is a sectional view similar to that shown in Fig. 2 but showing the check valve in a conduit having a dividing rib for splitting liquid flow into two streams.

Figure 7:
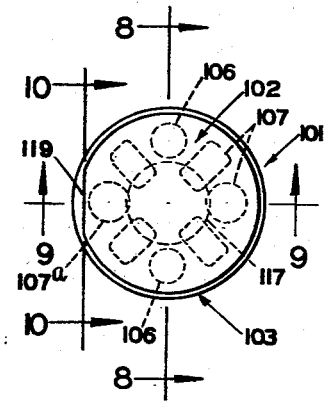
Figure 10:
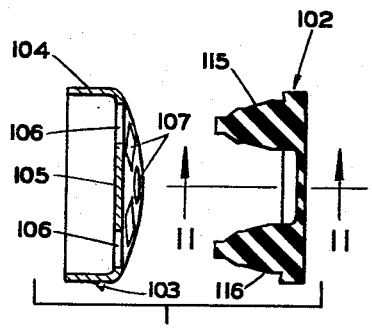
Figure 10:
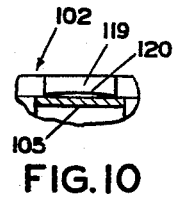
Figure 9:
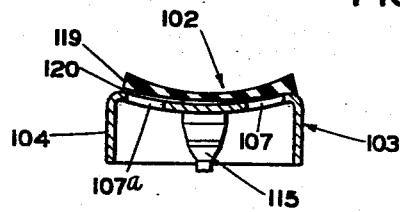
Figure 11:
Figure 8:
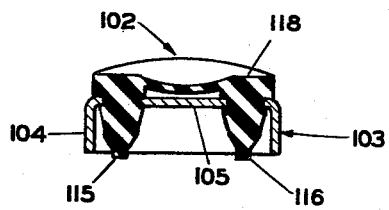

Fig. 6 is a fragmentary detail sectional view taken on the line 6—6 of Fig. 5 and showing the relation of the sealing rib to the valve disc, Fig. 7 is a plan view of a check valve and valve seat member embodying another form of this invention, Fig. 8 is a sectional view taken on the line 8—8 of Fig. 7, Fig. 8ᵃ is an exploded view of the section shown in Fig. 8, Fig. 9 is a sectional view taken on the line 9—9 of Fig. 7, Fig. 10 is an enlarged fragmentary sectional view taken on the line 10—10 of Fig. 7 and showing a slightly exaggerated leakage clearance on the check valve member, and Fig. 11 is a sectional view of the check valve member taken on the line 11—11 of Fig. 8ᵃ and showing the peripheral beveled portion of the valve member.

Referring to the drawings by characters of reference and more particularly to Figs. 1 to 6, there is shown a check valve 1 comprising a valve member 2 and a valve seat member 3. The valve seat member 3 comprises a cup-shaped cylinder having a cylinder wall portion 4 and a concave end wall or valve seat 5 of cylindrical curvature. The end wall 5 has a plurality of apertures 6, 7, 8, 9, 10 and 11 therethrough for passage of liquid and a pair of apertures 12 and 13 for securing the valve member 2. There is a slot 14 running from aperture 7 to aperture 10 diametrically across the end wall 5. The valve member 2 is a disc of a soft flexible elastomeric material. "Elastomeric" is intended to include rubbers and synthetic rubbers as well as other organic elastomers which are tough, highly elastic, and resistant to water, this valve being principally intended for use with water. The valve disc 2 has a pair of cylindrical bosses 15 and 16 projecting from the under surface thereof and lying on a diameter of the disc. The bosses 15 and 16 are tapered toward their ends and have a cylindrical hole or cavity 17 and 18 in each extending inward from the upper surface of the valve disc 2. The bosses 15 and 16 are operable to be inserted into the apertures 12 and 13 for securing the valve disc 2 to the concave end wall 5. The apertures 12 and 13 are of slightly smaller diameter than the bosses 15 and 16 so that when the bosses are inserted into apertures 12 and 13 until the valve disc 2 is flush with the end wall 5 the portions of the bosses surrounding the cavities 17 and 18 are compressed and the solid end portions of the bosses act as buttons to hold the valve disc 2 in position. The valve disc 2 has a rib 19 running diametrically thereacross on the under surface midway between the bosses 15 and 16 and in a line normal to the line between the bosses. The rib 19 fits into the slot 14 and is operable to tension the valve disc 2 against the concave valve seat 5. The peripheral portion of the valve disc 2 is thickened as by a pair of semi-annular or curved ribs 20 and 21 which stiffen the portions of the valve disc which cooperate with the liquid flow apertures 6, 7, 8, 9, 10 and 11. At opposite ends of the valve disc 2 are a pair of knobs or flanged portions 23.

In Fig. 5 the check valve 1 is shown in a conduit 22 having an enlarged portion 24 divided into two conduit passageways 25 and 26 by a rib member 27. The rib member 27 is straight and extends across the entrance to the enlarged conduit portion 24. The check valve 1 is positioned against the rib member 27 so that the rib member compresses the valve disc 2 along the line of the bosses 15 and 16. The knobs 23 at each end of the valve disc 2 lie in the line of contact with the rib member 27 and are compressed into the rounded cavity between the rib member 27 and the rounded edge of the end wall 5 of the valve seat body 4 (as shown in Fig. 6) so that when the valve is closed there can be no back flow from passageway 25 to passageway 26 around the rib member 27. Inasmuch as the rib member 27 prevents any communication between the passageways 25 and 26 and since the valve disc halves may open independently of each other the valve can control flow of liquid to either or both of the passageways 25 and 26 depending upon the back pressure therein. Referring to Fig. 1 it is seen that there is a notched portion 28 of thinner material than the rest of the valve disc 2 and is operable to allow for lateral expansion of the valve disc material when the valve is compressed into position (as in Fig. 6) thereby to prevent distortion of the valve disc which might result in leakage. When the valve unit is used without the compression rib 27 the knobs 23 would be eliminated on the valve disc to prevent an edge distortion which might cause leakage.

The operation of this check valve should be obvious from the specification heretofore related but will be concisely restated for clarity:

With reference to Fig. 5; water or other liquid will enter the conduit 22 in the direction of the directional arrow and will cause the valve disc halves to open away from the valve seat 5 permitting passage of liquid to the outlet conduits or passageways 25 and 26. When the flow of liquid is cut off the valve disc rib 19 will cause the valve halves to seat and to be tensioned against the valve seat. If one of the outlet passageways 25 or 26 should be closed the valve disc half controlling flow to the other passageway would open and the other valve disc half remain closed. It should be obvious that if it is desired to use the valve to control flow in a single conduit it would be necessary only to eliminate the rib member 27 dividing outlet flow. It should be noted that the cylindrical concavity of the valve seat 5 is necessary only to tension the valve disc member in closed position and several equivalent alternatives are possible. The valve seat might comprise two plane surfaces meeting at an oblique dihedral angle rather than a cylindrical concavity or the valve seat might be a plane surface and the valve disc convexly curved so that when fixed in position it would be tensioned as required.

Referring now to the form of check valve shown in Figs. 7 to 11, the valve member is modified slightly for simplicity of molding and of assembly to the valve seat member. In this form of construction there is a check valve unit 101 comprising a valve member 102 and a valve seat member 103. The valve seat member 103 comprises a cup-shaped cylinder having a cylindrical wall portion 104 and a cylindrically concave end wall or valve seat portion 105. The end wall 105 has a pair of valve securing apertures 106 and a plurality of flow apertures 107. The valve member 102 is a disc of a soft flexible elastomeric material such as a synthetic rubber. The valve material is tough, highly elastic and resistant to water. The valve disc 102 has a pair of tapered bosses 115 and 116 projecting from the under surface thereof and lying on a diameter of the disc. The bosses 115 and 116 are tapered toward their ends and are molded integrally with and of the same material as the valve disc 102. The bosses 115 and 116 are operable to be inserted into the apertures 106 to secure the valve disc 102 to the end wall 105 of the valve seat member 103. The apertures 106 are slightly smaller in diameter than the bosses 115, 116 so that when the bosses are inserted into said apertures they are slightly compressed as they are forced through said apertures and expand after passing through the apertures thereby providing a button-like arrangement to hold the valve disc in position. This assembled position is shown in the sectional view of Fig. 8. The central portion of the valve disc 102 is of reduced thickness as indicated at 117 having a small circular area. From the edge of the reduced portion 117 the valve disc 102 tapers outward along a conical curve to a peripherally thickened portion 118. In this form of valve construction the peripherally thickened portion 118 of the valve disc 102 performs the functions of the stiffening ribs 19, 20 and 21 in the form of valve shown in Figs. 1 to 6. This peripherally thickened portion acts to stiffen the peripheral portion of the valve disc overlying the flow apertures 107 and also functions to provide an additional tensioning means urging the valve disc into a flattened position in engagement with and closing the flow apertures. For some installations it is desirable that the check valve be permitted to have a small back leakage at low back pressures. One example where this may be required is in a washing machine mixing valve where it may be desirable to allow the valve to leak when the main supply of water is turned off thus permitting the mixing valve to drain and reduce danger of freezing damage. To accomplish this leakage at low back pressures the valve member may have a flat 119 cut thereon which provides a small edge opening 120 between the valve member and the valve seat 105. This edge opening is exaggerated slightly in the enlarged detail sectional view in Fig. 10 and is also shown in the sectional views Figs. 9 and 11, the aperture being provided by the flat 119 which is cut through the edge of the conically beveled or thickened portion 118. At low back pressures water may leak through the edge aperture 120 for discharge through aperture 107a but at high back pressures this edge aperture will close.

The valve member which has just been described is one which may be simply and inexpensively molded as by compression, injection or transfer molding and provides a valve which is very simply assembled.

This application is a continuation-in-part of my co-pending application for Liquid Flow Check Valve, Serial No. 778,589, filed October 8, 1947, and now abandoned.

Having thus described the invention what is claimed and desired to be secured by Letters Patent of the United States is:

1. A liquid flow check valve comprising a cylindrical cup-shaped valve seat member having a cylindrically concave end wall with a plurality of apertures therein, a valve member of a flexible resilient material in the form of a disc, said valve member having a pair of tapered bosses integral therewith and extending from one face thereof at points on a diameter thereof, said bosses registering with a pair of said end wall apertures and being operable to secure said valve member thereto, said valve member having a thin central portion adjacent said bosses and a thickened portion operable as a tensioning means to urge the same to a flattened position, said thickened portion comprising a conical beveled portion increasing uniformly in thickness from said thin central portion outward to the periphery of said valve member, the halves of said valve member on either side of said diameter being operable to bend away from said valve seat member to permit flow in one direction and to seat thereagainst to prevent flow in the opposite direction, and said valve disc having a groove at the periphery thereof forming a passage operable to permit leakage at low back pressures and to prevent leakage at high back pressures.

2. A liquid flow check valve comprising a cylindrical cup-shaped valve seat member having a cylindrically concave end wall with a plurality of apertures therein, a valve member of a flexible resilient material in the form of a disc, said valve member having a pair of tapered bosses integral therewith and extending from one face thereof at points on a diameter thereof, said bosses registering with a pair of said end wall apertures and being operable to secure said valve member thereto, said valve member having a thin central portion adjacent said bosses and a thickened portion operable as a tensioning means to urge the same to a flattened position, said thickened portion comprising a conical beveled portion increasing uniformly in thickness from said thin central portion outward to the periphery of said valve member, the halves of said valve member on either side of said diameter being operable to bend away from said valve seat member to permit flow in one direction and to seat thereagainst to prevent flow in the opposite direction, and said valve member having a flat cut along said conical beveled portion providing an edge aperture open at low back pressures and closed at high back pressures.

3. A liquid flow check valve comprising a body member having a concave wall portion comprised of elements of a cylinder, said wall portion having a pair of securing apertures therethrough positioned on the line of the element of greatest concavity of said wall portion and also having flow apertures therethrough on opposite sides of said line, a flexible valve member having a thin central portion and opposite peripheral thickened portions thickened transversely to the plane of said valve member and relative to said central portion and extending across said line, said valve member having a pair of boss members formed integral therewith and extending from one face thereof, said valve member and said peripheral portions being flexed and secured in substantially conforming relation to said wall portion by engagement of said boss members in said securing apertures, portions of said valve member being positioned in overlying relation to said flow apertures, said thickened portions being stressed by said boss members so as to urge the marginal portion of said valve member against said wall portion and said valve member into overlying closing relation to said flow apertures, said valve member being flexible away from said wall portion upon increased stressing of said thickened portions for flow through said flow apertures.

4. A check valve as defined in claim 3 wherein said valve member includes a pair of curved stiffening rib members formed integral with and extending from the other face of said valve member, said rib members being positioned on opposite sides of said line and operable to stiffen portions of said valve member positioned in overlying relation to said flow apertures.

5. A check valve as defined in claim 3 wherein said valve member includes a rib member formed integral with and extending from said face of said valve member, said rib member being positioned between said boss members and along a line substantially normal to a line extending from one of said boss members to the other and providing additional tensioning means to urge said valve member into overlying closing relation to said flow apertures.

6. A check valve as defined in claim 3 wherein said boss members include a cavity in their upper portion and have a cross section greater than said securing apertures so that said boss members are compressed at the portion surrounding said cavity thereby securing said boss members in said securing apertures.

7. A check valve member as defined in claim 3 comprising a rib member operable to divide liquid flowing from said check valve into two streams, said rib member being positioned adjacent to and compressively securing said valve member to said wall portion along said line of the element of greatest concavity, said wall portion having rounded end portions adjacent said rib member, said valve member having thickened sealing portions formed integral with and extending from said face, said sealing portions being operable to be compressed between said rib member and said rounded end portions to provide a seal against backflow from one of said streams to the other around the edge of said rib member.

8. A check valve member as defined in claim 3 wherein said valve member includes opposite thickened peripheral portions thickened transversely to the plane of said valve member and relative to said central portion, said last named thickened peripheral portions forming arcs on opposite sides of said line and operable to stiffen portions of said valve member positioned in overlying relation to said flow apertures.

9. A check valve member as defined in claim 3 wherein said valve member thickened peripheral portion extends around the circumference of said valve and said thickened portion overlying said flow apertures being operable to stiffen said portions of said valve member positioned in overlying relation to said flow apertures.

10. A check valve member as defined in claim 3 wherein said valve comprises a central portion having substantially flat parallel faces and an annular peripheral portion having faces diverging toward the outer periphery.

11. A check valve member as defined in claim 3 wherein said valve comprises a central portion having substantially flat parallel faces and an annular peripheral portion having one face parallel to and on the same plane as one of said central faces and a second face of said annular peripheral portion diverging toward the outer periphery of said valve, said boss members extending from said diverging annular face.

References Cited in the file of this patent

UNITED STATES PATENTS

| Number | Name | Date |
|---|---|---|
| 1,867,478 | Stelzner | July 12, 1932 |
| 1,978,025 | McCown | Oct. 23, 1934 |
| 2,051,023 | Bullard | Aug. 18, 1936 |
| 2,105,183 | Cover | Jan. 11, 1938 |
| 2,131,809 | Killen | Oct. 4, 1938 |
| 2,214,346 | Pim | Sept. 10, 1940 |
| 2,270,468 | Osborn | Jan. 20, 1942 |
| 2,291,603 | Barker | Aug. 4, 1942 |
| 2,429,984 | Berglund | Nov. 4, 1947 |

FOREIGN PATENTS

| Number | Country | Date |
|---|---|---|
| 59,270 | Sweden | 1923 |
| 897,256 | France | 1945 |